(12) United States Patent
Wada (10) Patent No.: US 6,940,531 B2
(45) Date of Patent: Sep. 6, 2005

(54) ENVIRONMENT-COMPLIANT IMAGE DISPLAY SYSTEM, IMAGE PROCESSING METHOD, AND INFORMATION STORAGE MEDIUM (75) Inventor: Osamu Wada, Ina (JP)

(73) Assignee: Seiko Epson Corporation, Tokyo (JP)

(*) Notice: Subject to any disclaimer, the term of this patent is extended or adjusted under 35 U.S.C. 154(b) by 359 days.

(21) Appl. No.: 10/111,321

(22) PCT Filed: Aug. 28, 2001

(86) PCT No.: PCT/JP01/07377

§ 371 (c)(1),
(2), (4) Date: Apr. 24, 2002

(87) PCT Pub. No.: WO02/19308

PCT Pub. Date: Mar. 7, 2002

(65) Prior Publication Data

US 2002/0180766 A1 Dec. 5, 2002

(30) Foreign Application Priority Data

Aug. 28, 2000 (JP) ..................... 2000-257160

(51) Int. Cl.[7] ............................... G09G 5/10
(52) U.S. Cl. .................. 345/690; 345/589; 345/590; 345/591; 382/167; 348/603; 358/520
(58) Field of Search ................. 345/77, 154, 207, 345/153, 179, 83, 88, 690, 591, 590, 589; 348/603, 602, 609, 612; 358/518, 520; 382/167, 164, 260

(56) References Cited

U.S. PATENT DOCUMENTS 5,099,316 A 3/1992 Ogawa
5,430,809 A * 7/1995 Tomitaka ................. 382/173
5,870,069 A 2/1999 Choh et al.
6,081,254 A * 6/2000 Tanaka et al. ............. 382/167
6,456,339 B1 * 9/2002 Surati et al. .............. 348/745
6,558,006 B2 * 5/2003 Ioka ......................... 353/94
6,695,451 B1 * 2/2004 Yamasaki et al. .......... 353/30

FOREIGN PATENT DOCUMENTS

| GB | 2 335 326 A | 9/1999 |
| GB | 2 341 033 A | 3/2000 |
| JP | A 11-355797 | 12/1999 |
| JP | A 2001-60082 | 3/2001 |

OTHER PUBLICATIONS

U.S. Appl. No. 10/111,323, filed Apr. 24, 2002, Wada.
U.S. Appl. No. 10/111,357, filed Apr. 24, 2002, Wada et al.

* cited by examiner

Primary Examiner—Xiao Wu
Assistant Examiner—Abbas Abdulselam
(74) Attorney, Agent, or Firm—Oliff & Berridge, PLC (57) ABSTRACT To provide an environment-compliant image display system, image processing method, and information storage medium that enable correction of images within a shorter time, a Y value of color signals (Y3, x3, y3) measured by a color light sensor 60 and converted by an Y3x3y3 conversion section 143 is substituted into Y1, which is a Y value of an ideal environment, by a Y substitution section 142; color difference between the substituted color signals (Y1, x3, y3) and ideal color signals (Y1, x1, y1) is obtained by a color difference calculation section 145; and an environment subjective coefficient correction section 148 corrects the color difference when the color difference does not lie within a permissible correction range, and use the corrected color difference (Δx', Δy') to correct the image display information.

13 Claims, 4 Drawing Sheets

ENVIRONMENT-COMPLIANT IMAGE DISPLAY SYSTEM, IMAGE PROCESSING METHOD, AND INFORMATION STORAGE MEDIUM

TECHNICAL FIELD

The present invention relates to an environment-compliant image display system, an image processing method, and an information storage medium.

BACKGROUND OF ART

When presentations or meetings are to be performed at a plurality of different locations, an important part of achieving an effective presentation is to make it possible to reproduce images exactly as the creator of those images intended, whatever the location.

One way of considering how to adjust the way in which such images are seen is management of the input-output characteristics of the device to achieve color management in the reproduction of colors.

However, conventional color management considers only image reproducibility; there is no consideration of over-correction.

In other words, when an image is viewed in a viewing environment (or work environment) in which there is ambient light such as artificial light, it may happen that over-correction is applied in practice, even when the image is displayed in a manner that is numerically ideal, because human beings can adapt to variations such as those of artificial light (color adaptation, brightness adaptation, and darkness adaptation).

The human eye is provided with four types of cell: cells that are sensitive to brightness, cells that are sensitive to red, cells that are sensitive to green, and cells that are sensitive to blue. These cells are provided with a mechanism that automatically corrects information that is input through the lens of the eye. It can therefore happen that mechanical correction of display information can result in over-correction.

DISCLOSURE OF INVENTION

The present invention was devised in the light of the above described problem, and may provide an environment-compliant image display system, image processing method, and information storage medium that take over-correction into consideration.

(1) In order to solve the above described problem, the present invention relates to an image display system of environment-compliant type which corrects image display information for displaying an image and displays the image, based on viewing environment information obtained by a viewing environment detection means which detects a viewing environment in a display area of the image, the image display system comprising:

brightness correction means for correcting brightness information included in the viewing environment information to conform with brightness of an ideal environment, based on the viewing environment information, when brightness of the image in the viewing environment differs from brightness of the image in the ideal environment;

color difference calculation means for calculating color difference based on color information included in the viewing environment information, in which the brightness information has been corrected, and color information of the image in the ideal environment;

color difference correction means for correcting the calculated color difference when the color difference lies outside a permissible correction range, so that the color difference lies within the permissible correction range; and image correction means for correcting the image display information, based on the color difference from the color difference correction means.

(2) The present invention further relates to an image display system of environment-compliant type which corrects image display information for displaying an image and displays the image, based on viewing environment information obtained by a viewing environment detection means which detects a viewing environment in a display area of the image, the image display system comprising:

brightness correction section which corrects brightness information included in the viewing environment information to conform with brightness of an ideal environment, based on the viewing environment information, when brightness of the image in the viewing environment differs from brightness of the image in the ideal environment;

a color difference calculation section which calculates color difference based on color information included in the viewing environment information, in which the brightness information has been corrected, and color information of the image in the ideal environment;

a color difference correction section which corrects the calculated color difference when the color difference lies outside a permissible correction range, so that the color difference lies within the permissible correction range; and an image correction section which corrects the image display information, based on the color difference from the color difference correction section.

The present invention makes it possible to reproduce the image appearance to suit the human eye, without over-correction, by correcting the color difference to lie within the permissible correction range, if the obtained color difference does not lie within the permissible correction range.

Note that the permissible correction range is a range in which over-correction does not occur when the image display information for displaying the image is corrected by a color difference value, by way of example.

The present invention also makes it possible to obtain the color difference for color alone, excluding the brightness element, by correcting the brightness information that indicates the brightness of the image in the viewing environment to conform with the brightness in an ideal environment.

This makes it possible to correct image display information rapidly, by applying correction amounts as the color difference, by way of example.

It is therefore possible to implement an image display system that enables corrections of the way in which the image is seen, within a short time.

Note that the brightness information may be data such as the L value of colors expressed in Lab format or the Y value of colors expressed in Yxy format (or xyY format), by way of example. Similarly, the color information may be the a and b values of colors expressed in Lab format or the x and y values of colors expressed in Yxy format.

The x value, y value, and z value in this case represent ratios of X to Y to Z that add up to 1, and a color gamut can be expressed as a bell-shaped color triangle on an xy chromaticity diagram by representing them in Yxy format.

The Lab format may also be used, enabling representation of the color gamut as a circle. The Yxy format and Lab format are determined as international standards by the International Commission on Illumination (CIE). The image display information corresponds to data such as an input-output profile or look-up table.

(3) In this image display system, the color difference correction means may output the color difference by multiplying the color difference input to the color difference correction means by a given coefficient.

This makes it possible to correct the color difference rapidly, by multiplying the input color difference by the given coefficient and outputting the resultant color difference. This enables real-time correction of the image display information.

Note that if this coefficient is assumed to be k, it is desirable that: 0<k<=1.0. In addition, the value of the coefficient k may be smaller when the viewing environment is bright than when it is dark.

(4) In other words, when the image information for the ideal environment and the viewing environment information is in Yxy format, by way of example, it is desirable that k=f(Y), in other words, the coefficient k may be a functional value that varies according to the brightness information of the image in an ideal environment or the brightness information included in the viewing environment information.

By setting the coefficient k in such a manner, it becomes possible to correct the image display information in an appropriate manner with respect to brightness, thus making it possible to apply a correction that is appropriate for the adaptation of the human eye.

Note that the image information maybe original image data, by way of example.

In this image display system, the image information for the ideal environment and the viewing environment information may be expressed in Lab format or Yxy format. The brightness correction means may substitute the L value or Y value of the viewing environment information into the L value or Y value of the viewing environment information.

This makes it possible to rapidly obtain the color values x3 and y3 included in the viewing environment information and the color values x1 and y1 for the ideal environment, when an image is expressed in Yxy format, by way of example, by substituting the brightness value Y3 included in the viewing environment information into the brightness value Y1 for the ideal environment.

In this image display system, the viewing environment detection means may be means which measures tristimulus values of an image in the display area or means which capturing an image in the display area.

Since the measurement of the luminance of the image or the capture of the image is done irrespective of the distance between the display means and the display area, this makes it possible to detect the viewing environment appropriately, even if the distance between the display means and the display area should change.

Note that the tristimulus values of an image are equivalent to XYZ values, RGB values, and also xbar, ybar, and zbar values, and rbar, gbar, and bbar values that are color matching function values of those XYZ values and RGB values, by way of example.

(5) This image display system may also comprise a front-projection-type image projection device including:
the brightness correction means;
the color difference calculation means;
the color difference correction means;
the image correction means; and
means for projecting a corrected image towards the display area.

This makes it possible to detect the viewing environment appropriately by using the viewing environment detection means even when using a front-projection-type image projection device and the distance between the projection means and the screen having a display area has been altered by a change in the environment in which it is installed.

(6) The present invention still further relates to an image processing method of environment-compliant type which corrects image display information for displaying an image, based on viewing environment information indicating a viewing environment in a display area of the image, the image processing method comprising:
a step of generating the viewing environment information;
a color difference calculation step of calculating color difference between a given image in the viewing environment and the given image in an ideal environment, based on the generated viewing environment information;
a color difference correction step of correcting the calculated color difference when the color difference lies outside a permissible correction range so that the color difference lies within the permissible correction range; and
a step of correcting the image display information, based on the color difference output by the color difference correction step.

The present invention makes it possible to reproduce the image appearance to suit the human eye, without overcorrection, by correcting the color difference to lie within the permissible correction range, when the obtained color difference does not lie within the permissible correction range.

The present invention also makes it possible to correct image display information rapidly, by applying color differences as amounts of correction, by way of example.

It is therefore possible to correct the way in which the image is seen, within a short period of time.

(7) In this image processing method, the color difference that is input in the color difference correction step may be multiplied by a given coefficient and is output.

This makes it possible to correct the color difference rapidly, by multiplying the input color difference by the given coefficient and outputting the resultant color difference. This enables real-time correction of the image display information (8) In this image processing method, the viewing environment information may comprise color information indicating color of the image in the viewing environment and brightness information indicating brightness of the image in the viewing environment, and
the color difference correction step may comprise:
a step of correcting brightness information included in the viewing environment information to conform with brightness of the ideal environment, based on the viewing environment information, when brightness of the image in the viewing environment differs from brightness of the image in the ideal environment; and
a step of calculating the color difference based on color information included in the viewing environment information, in which the brightness information has been corrected, and color information of the image in the ideal environment.

This makes it possible to obtain color difference for color alone, excluding the brightness element, by correcting the brightness information that indicates the brightness of the image in the viewing environment to conform with the brightness in an ideal environment.

In this image processing method, image information for the ideal environment and the viewing environment information may be expressed in Lab format or Yxy format. The brightness correction step may comprise a step of substituting the L value or Y value of the viewing environment information into the L value or Y value of the image information for the ideal environment.

This makes it possible to rapidly obtain the color difference between x3 and y3 included in the viewing environment information and the color values x1 and y1 for the ideal environment, by substituting the brightness value Y3 included in the viewing environment information into the brightness value Y1 for the ideal environment, if an image is expressed in Yxy format, by way of example.

(9) The present invention yet further relates to a computer-readable information storage medium which stores program for correcting image display information for displaying an image, based on viewing environment information indicating a viewing environment in a display area of the image, the information storage medium comprising program to implement on a computer:

means which generates the viewing environment information;

color difference calculation means which calculates color difference between a given image in the viewing environment and the given image in an ideal environment, based on the generated viewing environment information;

color difference correction means which corrects the calculated color difference when the color difference lies outside a permissible correction range so that the color difference lies within the permissible correction range; and means which corrects the image display information, based on the color difference output by the color difference correction means.

The present invention makes it possible to reproduce the image appearance to suit the human eye, without overcorrection, by correcting the color difference to lie within the permissible correction range, when the obtained color difference does not lie within the permissible correction range.

The present invention makes it possible to obtain color difference for color alone, excluding the brightness element, by correcting the brightness information that indicates the brightness of the image in the viewing environment to conform with the brightness in an ideal environment.

This makes it possible to correct image display information rapidly, by applying correction amounts to the color difference, by way of example.

It is therefore possible to implement an image display system that enables corrections of the way in which the image is seen, within a short time.

(10) In this information storage medium, the color difference correction means may output the color difference by multiplying the color difference input to the color difference correction means by a given coefficient.

This makes it possible to correct the color difference rapidly, by multiplying the input color difference by the given coefficient and outputting the resultant color difference. This enables real-time correction of the image display information.

(11) In this information storage medium, the viewing environment information may comprise color information indicating color of the image in the viewing environment and brightness information indicating brightness of the image in the viewing environment, and the color difference correction means may comprise:

means which corrects brightness information included in the viewing environment information to conform with brightness of the ideal environment, based on the viewing environment information, when brightness of the image in the viewing environment differs from brightness of the image in the ideal environment; and means which calculates the color difference based on color information included in the viewing environment information, in which the brightness information has been corrected, and color information of the image in the ideal environment.

The present invention makes it possible to obtain color difference for color alone, excluding the brightness element, by correcting the brightness information that indicates the brightness of the image in the viewing environment to conform with the brightness in an ideal environment.

BEST MODE FOR CARRYING OUT THE INVENTION

The description below relates to a case in which the present invention is applied to an image display system which uses a liquid-crystal projector, with reference to the accompanying figures. Note that the embodiments described herein do not in any way limit the scope of the invention as defined by the claims. Similarly, the entirety of the configuration described for these embodiments does not place any limitations on the essential components of the means in accordance with the present invention, as laid out herein.

Description of Overall System

Figure 1:
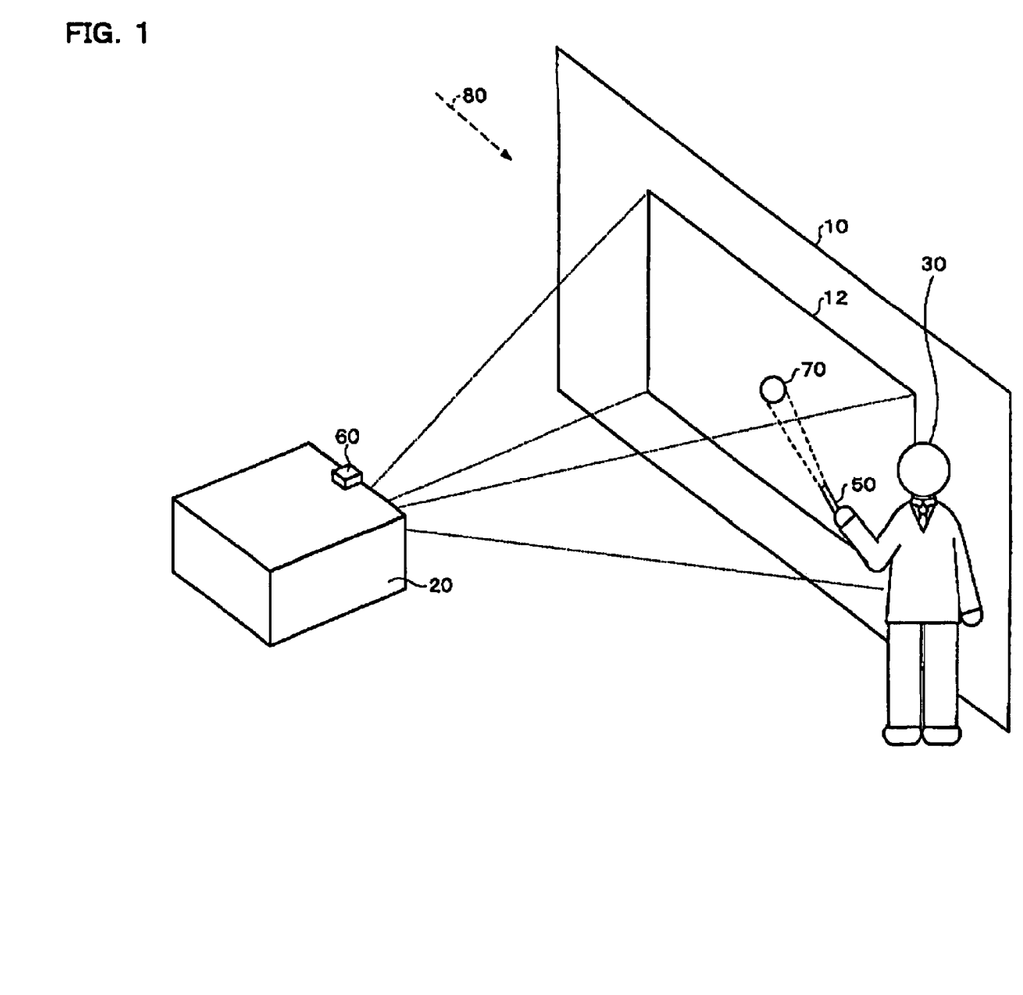
FIG. 1 is a schematic illustrative view of an image display system in accordance with an example of this embodiment.

A schematic illustrative view of an image display system in accordance with an example of this embodiment of the present invention is shown in FIG. 1.

A projector 20, which is a front-projection-type display device provided substantially facing a screen 10, projects a given image for presentation. A presenter 30 gives a presentation to an audience, while using a light spot 70 projected from a laser pointer 50 to point at a desired position of an image in an image display region 12, which is a display area on the screen 10.

During such a presentation, the image appearances on the image display region 12 will vary greatly, depending on factors such as the type of the screen 10 and ambient light 80. When the projector 20 displays the same white, for example, the type of the screen 10 could make it seem to be white with a yellow cast or white with a blue cast. Similarly, differences in the ambient light 80 could make the same white that is displayed by the projector 20 appear to be a bright white or a dull white.

In recent years, this projector 20 has become smaller and easier to transport. For that reason, it has become possible for the presenter 30 to perform presentations at a client's location, by way of example, but it is difficult to adjust colors to match the environment at the client's location and the manual adjustment of colors at the client's location takes too much time.

Figure 2:
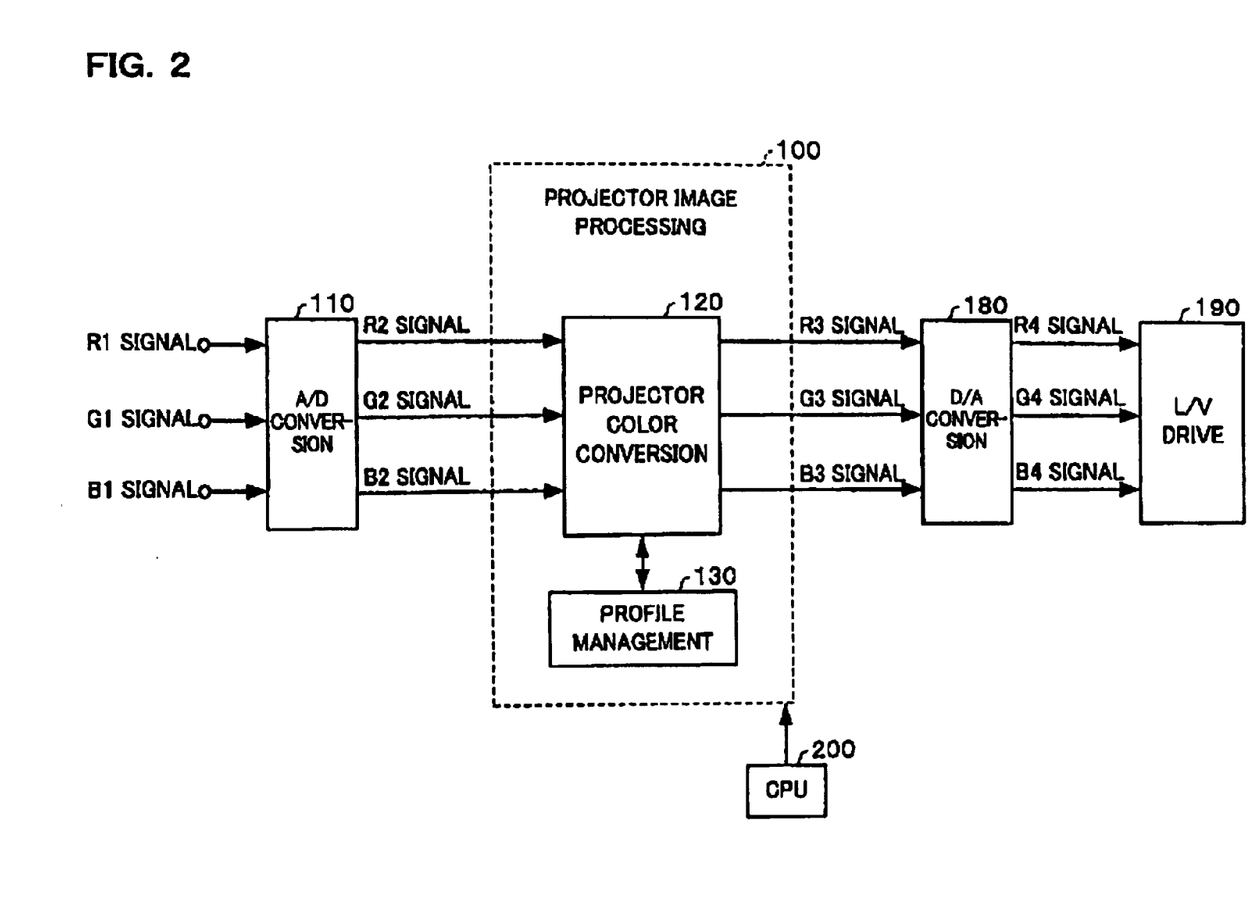
FIG. 2 is a functional block diagram of an image processing section within a conventional projector.

A functional block diagram of the image processing section within a conventional projector is shown in FIG. 2.

This conventional projector inputs an R1 signal, a G1 signal, and a B1 signal, which form RGB signals in analog format sent from a PC or the like, to an A/D conversion section 110 and then the input signals are color-converted into digital format of an R2 signal, a G2 signal, and a B2 signal by a projector image processing section 100.

An R3 signal, a G3 signal, and a B3 signal that have been subjected to the color conversion are input to a D/A conversion section 180, and an R4 signal, a G4 signal, and a B4 signal that have been converted into analog form are input to a light valve (L/V) drive section 190, to drive a liquid-crystal light valve and thereby display an image.

The projector image processing section 100, which is controlled by a CPU 200, comprises a projector color conversion section 120 and a profile management section 130.

The projector color conversion section 120 converts the RGB digital signals (the R2 signal, G2 signal, and B2 signal) from the A/D conversion section 110 into RGB digital signals for projector output (the R3 signal, G3 signal, and B3 signal), based on a projector input-output profiles that are managed by the profile management section 130. Note that "profile" in this case refers to characteristic data.

In this manner, the conventional projector can only perform color conversion based on input-output profiles that indicate input-output characteristics which are specific to that particular projector, and thus no consideration is paid to the viewing environment in which the image is projected and displayed.

However, it is difficult to ensure that the color appearances are uniform with this configuration, without taking the viewing environment into account. The color appearances are determined by three factors: light, the reflection or transmission of light by objects, and vision.

This embodiment of the present invention implements an image display system that can reproduce identical colors, by detecting the viewing environment of light including the reflection or transmission of that light by objects, irrespective of the environment in which it is used.

The image appearance is also affected by the distance between the projector 20 and the screen 10. It is possible to measure the distance between the projector 20 and the screen and correct the image from consideration of that distance, but the provision of a distance measurement means in addition to the image correction means would make the image display system itself much larger.

With this embodiment, images are corrected without having to provide a distance measurement means, by applying an image processing method that is not dependent on the distance between the projector 20 and the screen 10.

More specifically, the device is provided with a color light sensor 60 that functions as viewing environment detection means for detecting the viewing environment, as shown in FIG. 1, where viewing environment information from the color light sensor 60 is input to the projector 20. The color light sensor 60 measures color light information (more specifically, RGB or XYZ tristimulus values) within the image display region 12 of the screen 10. In this case, the color light sensor 60 detects tristimulus values of an image that is displayed in the image display region 12. These tristimulus values may be XYZ values and xbar, ybar, and zbar values that are color matching function values of those XYZ values, together with RGB values and rbar, gbar, and bbar values that are color matching function values of those RGB values, by way of example.

The projector 20 is provided with brightness correction means, for correcting brightness information that is included in the viewing environment information to conform with the brightness of the ideal environment, based on the viewing environment information, if the image brightness in the viewing environment differs from the image brightness in the ideal environment; color difference calculation means for calculating color difference between color information included in the viewing environment information, in which the brightness information has been corrected, and color information of an image in the ideal environment; and image correction means for correcting image display information that is used for displaying the image, based on the calculated color difference.

To ensure that the projector 20 prevents over-correction of the image display information, it is provided with color difference correction means that operates when the value of the above described color difference lies outside the given permissible correction range, to correct the color difference in such a manner that is lies within the permissible correction range.

The use of this configuration enables the implementation of an image display system that corrects image display information as appropriate, irrespective of the distance between the projector 20 and the screen 10 and while preventing over-correction.

Note that the sequence of image processing for correcting the image is such that a white image is projected from the projector 20 to the screen 10 at each of given gray scales and the viewing environment is detected by measuring tristimulus values of the image in the image display region 12 by the color light sensor 60.

The correction of the image display information for each of those gray scales is based on those tristimulus values.

The description now turns to details of the image processing method performed to correct the image, using the functional blocks of the image processing section of the projector 20 which comprises components such as the above color difference correction means.

Figure 3:
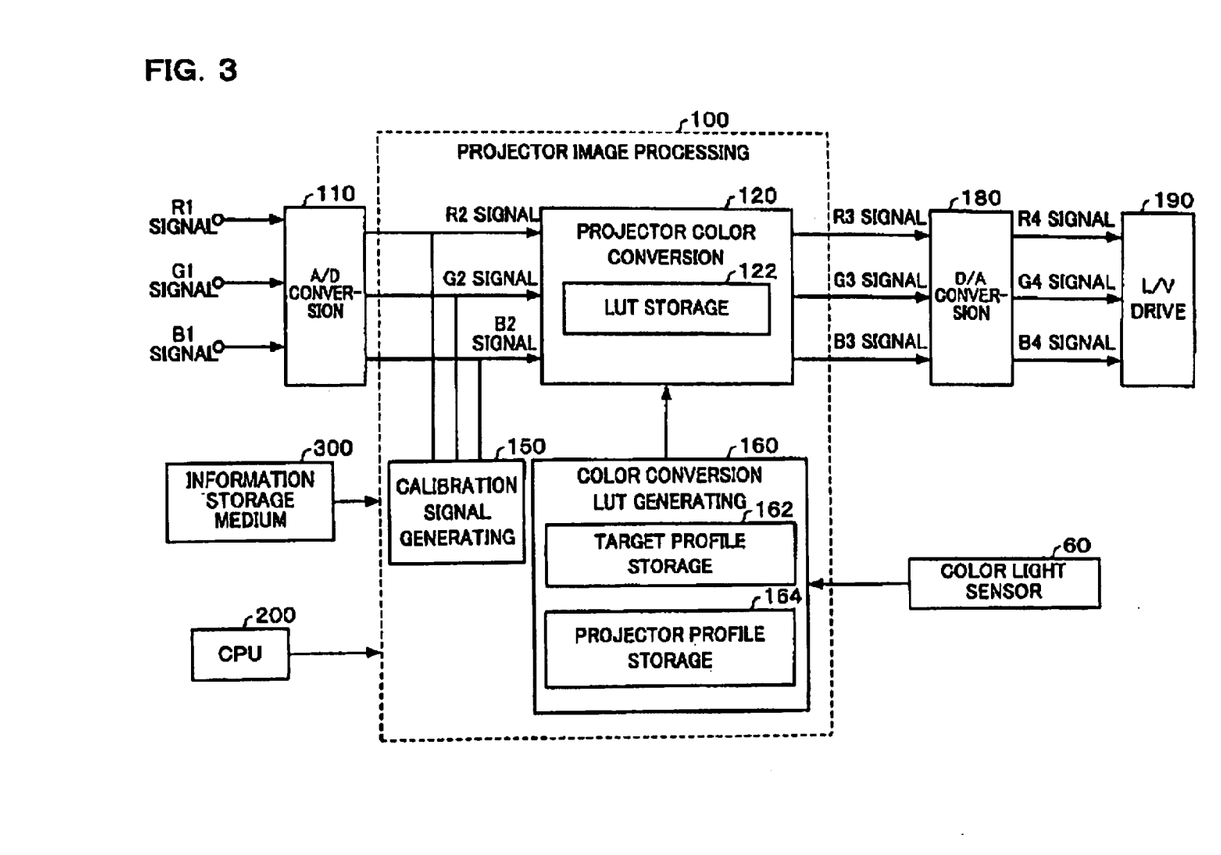
FIG. 3 is a functional block diagram of the image processing section within a projector in accordance with an example of this embodiment.

A functional block diagram of the image processing section within the projector 20 in accordance with an example of this embodiment is shown in FIG. 3.

The projector 20 inputs the R1 signal, G1 signal, and B1 signal (which form RGB signals in analog format, sent from a PC or the like) to the A/D conversion section 110, and the projector image processing section 100 performs color conversion on the digital R2 signal, G2 signal, and B2 signal.

The projector 20 inputs the color-converted R3 signal, G3 signal, and B3 signal to the D/A conversion section 180, then inputs the analog-converted R4 signal, G4 signal, and B4 signal to the light valve (L/V) drive section 190 which projects and displays the image by driving a liquid-crystal light valve.

Up until this point, there is no difference from the configuration of the conventional projector. The projector image processing section 100 of the projector 20 in accordance with this embodiment comprises a color signal conversion section 160, a color signal reverse-conversion section 170, a color management section 150, and the projector color conversion section 120.

The color signal conversion section 160 converts the digital RGB signals (R2 signal, G2 signal, and B2 signal) from the A/D conversion section 110 into XYZ values (X1, Y1, Z1). Note that the colors represented by RGB signals are device-dependent colors that are affected by the input-output device, such as the projector 20, whereas the XYZ values are device-independent colors that are the same regardless of the device.

Note also that a method such as a matrix-conversion method using a 3 by 3 matrix can be used as the specific method for converting from the RGB digital signals to the XYZ values.

The color signal conversion section 160 outputs the converted XYZ values (X1, Y1, Z1) to the color management section 150.

The color management section 150 takes the XYZ values (X1, Y1, Z1) that have been input from the color signal conversion section 160 and converts them into XYZ values (X2, Y2, Z2) that adapt to the viewing environment, based on a measured value from the color light sensor 60 that is the viewing environment detection means.

The color management section 150 also comprises a color light information processing section 140 and the profile management section 130 that manages the above described input-output profiles for the projector 20.

Figure 4:
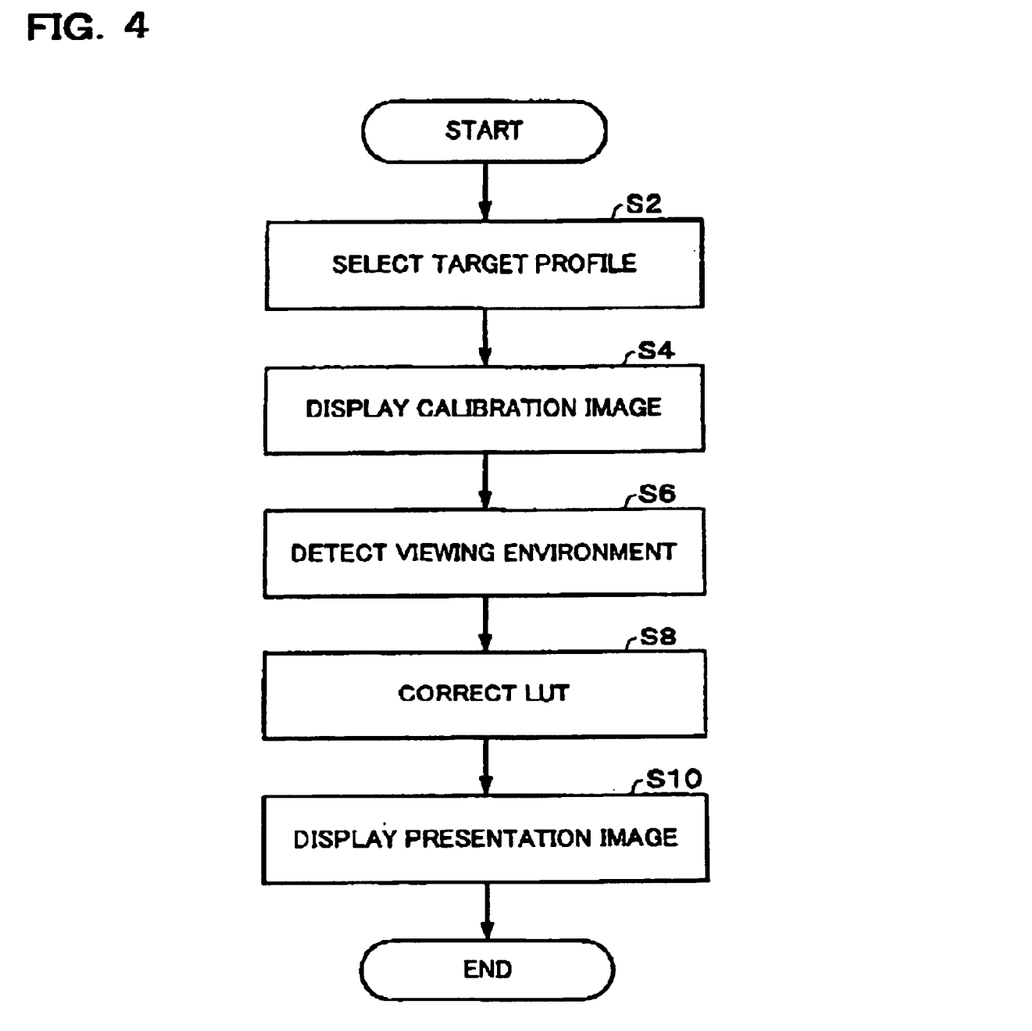
FIG. 4 is a functional block diagram of the color light information processing section in accordance with an example of this embodiment.

The description now turns to details of the color light information processing section 140.

A functional block diagram of the color light information processing section 140 in accordance with an example of this embodiment is shown in FIG. 4.

The color light information processing section 140 comprises a Y1x1y1 conversion section 141, which converts color signals (X1, Y1, Z1) in XYZ format for an ideal environment from the color signal conversion section 160 into color signals (Y1, x1, y1) in Yxy format; a Y3x3y3 conversion section 143, which converts color signals (X3, Y3, Z3) in XYZ format from the color light sensor 60 that represent the viewing environment into color signals (Y3, x3, y3) in Yxy format; and a Y substitution section 142 that functions as brightness correction means.

The Y substitution section 142 substitutes Y3 of the color signals (Y3, x3, y3) with Y1, based on Y1, which is part of the color signals from the color signal conversion section 160, and the color signals (Y3, x3, y3) from the Y3x3y3 conversion section 143.

This makes it possible to calculate the color difference in a state in which the brightness of the color information for the ideal environment and the color information in the actual viewing environment are at the same level, during processing by the Y substitution section 142 and subsequent components, by converting the brightness information Y3 included in the environment information for the viewing environment into Y1 in such a manner that it conforms with the brightness in the ideal environment. This makes it possible to perform the calculations at a higher speed, because only the color differences for the colors alone need be calculated.

The color light information processing section 140 comprises color difference correction calculation section 144 that calculates color differences and a tristimulus values conversion section 147 that converts color signals into tristimulus values (X2, Y2, Z2), based on the calculated color differences.

The color difference correction calculation section 144 comprises color difference calculation section 145, a Y2x2y2 conversion section 146, and an environment subjective coefficient correction section 148.

The color difference calculation section 145 calculates color differences between the color signals (Y1, x3, y3) from the Y substitution section 142 and the color signals (Y1, x1, y1) from the Y1x1y1 conversion section 141.

Since the Y1 values (indicating brightness) of these two sets of color signals match, the color difference between the values (x3, y3) and (x1, y1) expressed on an xy chromaticity diagram can be calculated.

As a result, the color difference $\Delta x$ between X3 and x1 and the color difference $\Delta y$ between y3 and y1 are obtained.

In other words, there is a shift of $\Delta x$ and $\Delta y$ from the color of the ideal image. The color of the image may be corrected by corrections of $-\Delta x$ and $-\Delta y$, to correct this shift.

However, the human eye has mechanisms such as color adaptation, brightness adaptation, and darkness adaptation that accommodate to the main color lighting of the surroundings, such as artificial light, and affect way in which colors are seen. For that reason, it may happen that a correction that is thought to be optimal in the numerical sense become over-correction.

That is why this embodiment is provided with the environment subjective coefficient correction section 148, which is color difference correction means.

The environment subjective coefficient correction section 148 determines whether or not the values of $\Delta x$ and $\Delta y$ lie within a given permissible correction range.

If they do lie within the permissible correction range, the environment subjective coefficient correction section 148 outputs $\Delta x$ and $\Delta y$ unchanged to the Y2x2y2 conversion section 146 as $\Delta x'$ and $\Delta y'$.

If they do not lie within the permissible correction range, the environment subjective coefficient correction section 148 corrects $\Delta x$ and $\Delta y$ so that they do lie within the permissible correction range, and output the corrected values of $\Delta x$ and $\Delta y$ as $\Delta x'$ and $\Delta y'$ to the Y2x2y2 conversion section 146.

Note that correction is done by multiplication by a given coefficient, during the correction to ensure that $\Delta x$ and $\Delta y$ lie within the permissible correction range. If this coefficient is k, by way of example, $\Delta x'=k*\Delta x$ and $\Delta y'=k*\Delta y$.

Since this is just multiplication by a coefficient, it is possible to perform image processing without losing any real-time characteristics, even when the color difference needs correction.

Note that it is desirable that the value of k is greater than 0.0 but less than or equal to 1.0. In addition, it is desirable that the value of k is larger when the viewing environment is dark and smaller when the viewing environment is light. This is because difference between the actual image and the ideal image becomes larger as the viewing environment becomes brighter, and the human eyes can adapt to a certain degree in spite of their imperfectness with respect to such environment information.

If k is assumed to be 0.5 when the environment is bright, by way of example, $\Delta x'$ is half the value of $\Delta x$, so the correction is done by half the ordinary amount of correction $\Delta x$, from consideration of adaptation of the image display information. If k is 0.9 when the environment is dark, $\Delta x'$ is nine-tenths the magnitude of $\Delta x$, so the image display information is not corrected significantly.

In this manner, over-correction can be prevented and thus the image can be reproduced appropriately, by correcting the color difference when necessary.

More specifically, the coefficient k is a functional value that varies with Y1, which is brightness information of an image in an ideal environment. As previously mentioned, the human eye has mechanisms such as color adaptation and brightness adaptation, and the levels of adaptation differ between various gray levels, such as high gray scale regions, medium gray scale regions, and low gray scale regions. It is therefore possible to obtain correction amounts ($\Delta x'$ and $\Delta y'$) that are suitable for different gray scales, by first obtaining a k value for the brightness, then determining the optimal k value for each gray scale region.

The Y2x2y2 conversion section 146 outputs values (x2, y2) which are the those of the ideal color (x1, y1) corrected by $\Delta x'$ and $\Delta y'$ from the environment subjective coefficient correction section 148, together with Y2 to the tristimulus values conversion section 147. Note that the tristimulus values conversion section 147 uses Y1 and Y2 without modification.

The tristimulus values conversion section 147 converts the color signals (Y2, x2, y2) from the Y2x2y2 conversion section 146 into tristimulus values (X2, Y2, Z2).

The color light information processing section 140 outputs the tristimulus values (X2, Y2, Z2) from the tristimulus values conversion section 147 to the color signal reverse-conversion section 170.

The profile management section 130 functions as the above described image correction means and creates the input-output profiles for the RGB signals of the projector 20. Note that each input-output profile is part of the information for image display used for displaying images. The profile management section 130 also manages the RGB input-output characteristic of the projector 20, using the created input-output profiles for the RGB signals.

The color signal reverse-conversion section 170 performs a reverse conversion on the XYZ values (X2, Y2, Z2) from the color light information processing section 140 to convert them into RGB digital signals (an R5 signal, a G5 signal, and a B5 signal), using a inverse matrix of the matrix of the above-described color signal conversion section 160.

The projector color conversion section 120 takes the RGB digital signals (the R5 signal, G5 signal, and B5 signal) from the color signal reverse-conversion section 170 and converts them into the RGB digital signals (the R3 signal, G3 signal, and B3 signal) for projector output, with reference to the projector profile managed by the profile management section 130.

The projector image processing section 100 that is controlled by the CPU 200 comprises the projector color conversion section 120 and the profile management section 130.

The projector color conversion section 120 takes the RGB digital signals (the R6 signal, G6 signal, and B6 signal) from the A/D conversion section 110 and converts them into the RGB digital signals for projector output (the R3 signal, G3 signal, and B3 signal), based on the input-output profiles of the RGB signals that are managed by the profile management section 130.

The RGB digital signal for projector output that have been output from the projector color conversion section 120 are converted into the RGB analog signals (the R4 signal, G4 signal, and B4 signal) by the D/A conversion section 180, and a liquid-crystal light valve is driven by the L/V drive section 190 to project and display an image, based on those RGB analog signals.

As described above, a presentation image that has been corrected in a manner that is appropriated for the viewing environment can be displayed, when image display information is corrected for each gray scale and the actual presentation image is displayed.

Thus images are projected and displayed in this embodiment, taking the viewing environment into account.

This makes it possible to display an image that conforms with the viewing environment during image display, so that differences in display environment can be absorbed and the same image can be displayed irrespective of the environment that is applied. It is therefore possible to reproduce substantially the same colors within a short period of time, at a plurality of different locations.

This embodiment makes it possible to obtain color difference for color alone, excluding the brightness element, by correcting the brightness information that indicates the brightness of the image in the viewing environment to conform with the brightness in an ideal environment.

In particular, it is possible to rapidly obtain the color differences between color values x3 and y3 included in the viewing environment information and the color values x1 and y1 in the ideal environment, by substituting the brightness value Y3 included in the viewing environment information into the brightness value Y1 for the ideal environment.

It is also possible to prevent over-correction and ensure appropriate reproduction of the image, by the provision of the environment subjective coefficient correction section 148 that corrects the color difference if necessary.

Description of Hardware

Note that the hardware described below by way of example can be used to implement the above described components.

For example, the configuration could be implemented by an A/D converter or the like as the A/D conversion section 110; a D/A converter or the like as the D/A conversion section 180; a liquid-crystal light valve driver as the L/V drive section 406; an image processing circuit and ASIC or the like as the projector color conversion section 120, the color signal conversion section 160, the color signal reverse-conversion section 170, and the color light information processing section 140; and circuitry having a storage area such as RAM or the like as the profile management section 130. Note that these portions may be implemented in a hardware fashion by circuitry, or they may be implemented in a software fashion by drivers.

In addition, the functions of the components shown in FIG. 3 maybe implemented by reading out a program from an information storage medium 300. The information storage medium 300 could be a CD-ROM, DVD-ROM, ROM, RAM, or HDD, by way of example, and the method of reading the program therefrom could be a direct method or an indirect method.

Instead of the information storage medium 300, it is possible to implement the above described functions by downloading a program that implements those functions from a host device or the like over a transfer path. In other words, a program for implementing these functions may be embodied over carrier waves.

The hardware described below may be employed for the color light sensor 60.

For example, the configuration may have a color filter that selectively passes one of the stimulus value of the tristimulus values of the image displayed on the image display region 12, a photodiode that inputs a color signal from the color filter, an A/D converter that converts an analog signal from the photodiode into a digital signal, and an OP amp that amplifies that digital signal.

Note the present invention has been described above by way of an embodiment thereof, but the application of the present invention is not limited to the above embodying example.

Modification

For example, the viewing environment detection means may be imaging means such as a CCD camera or a CMOS camera, instead of the color light sensor 60.

In addition, the embodying example given above was described with reference to an environment correction coefficient k that is a functional value which varies with brightness, but the value of k may equally well be a constant.

Furthermore, the description of the embodying example above related to an example of the correction of an image by the Yxy format, but it is equally possible to perform image correction by another type of representative format having brightness information and color information, such as the Lab format or Luv format. If the Lab format is used, by way of example, it is possible to correct the image by a method similar to the above described one, by reading Y as L and x and y as a and b.

Note that the above described screen 10 was of a reflective type but it may equally well be of a transparent type.

The present invention can also be applied to presentations in which images are displayed by a display means other than a projection means such as the above described projector. Apart from a liquid-crystal projector, this display means could be a projector using a cathode ray tube (CRT), a plasma display panel (PDP), a field emission device (FED), an electro-luminescence (EL) device, or a direct-view type of liquid crystal display device, or a digital micromirror device (DMD)), by way of example. Note that DMD is a tradename registered by Texas Instruments Inc., of the US. In addition, the projector is not limited to a front-projection-type device; it may equally well be of a rear-projection type.

The time required for image correction can be shortened by the above described method of substituting brightness information, even when the present invention is applied to the above types of image display means.

Note that it is possible to correct the image irrespective of distance, even when the present invention is applied to image display means in which the distance between the projected position of the image and the display area of the image varies, as in a front-projection-type projector.

In addition to presentations, this invention is also effective in the display of images such as those at meetings, during medical treatment, in the design and fashion fields, business activities, commercials, and education, as well as general-purpose images such as those in movies, TV, videos, and games.

Note that the functions of the above-described projector image processing section 100 of the projector 20 may be implemented by a single image display device (such as the projector 20 itself) or by distribution between a plurality of processing devices (such as distributed processing between the projector 20 and a PC).

What is claimed is:

1. An image display system of environment-compliant type which corrects image display information for displaying an image and displays the image, based on viewing environment information obtained by a viewing environment detection means which detects a viewing environment in a display area of the image, the image display system comprising:

brightness correction means for correcting brightness information included in the viewing environment information to conform with brightness of an ideal environment, based on the viewing environment information, when brightness of the image in the viewing environment differs from the brightness of the image in the ideal environment;

color difference calculation means for calculating color difference based on color information included in the viewing environment information, in which the brightness information has been corrected, and color information of the image in the ideal environment;

color difference correction means for correcting the calculated color difference when the calculated color difference lies outside a permissible correction range, so that the corrected color difference lies within the permissible correction range; and image correction means for correcting the image display information, based on the corrected color difference from the color difference correction means.

2. The image display system as defined by claim 1, the color difference correction means outputting the corrected color difference by multiplying the calculated color difference input to the color difference correction means by a given coefficient.

3. The image display system as defined by claim 2, the coefficient being a functional value that varies according to brightness information of the image in an ideal environment or the brightness information included in the viewing environment information.

4. The image display system as defined in claim 3, comprising a projector that projects an image to the display area, the projector including:

the brightness correction means;

the color difference calculation means;

the color difference correction means; and the image correction means.

5. An image display system of environment-compliant type which corrects image display information for displaying an image and displays the image, based on viewing environment information obtained by a viewing environment detection section which detects a viewing environment in a display area of the image, the image display system comprising:

a brightness correction section which corrects brightness information included in the viewing environment information to conform with brightness of an ideal environment, based on the viewing environment information, when brightness of the image in the viewing environment differs from the brightness of the image in the ideal environment;

a color difference calculation section which calculates color difference based on color information included in the viewing environment information, in which the brightness information has been corrected, and color information of the image in the ideal environment;

a color difference correction section which corrects the calculated color difference when the calculated color difference lies outside a permissible correction range, so that the corrected color difference lies within the permissible correction range; and an image correction section which corrects the image display information, based on the corrected color difference from the color difference correction section.

6. The image display system as defined in claim 5, comprising a projector that projects an image to the display area, the projector including:

the brightness correction section;

the color difference calculation section;

the color difference correction section; and the image correction section.

7. An image processing method of environment-compliant type which corrects image display information for displaying an image, based on viewing environment information indicating a viewing environment in a display area of the image, the image processing method comprising:

generating the viewing environment information;

calculating color difference between a given image in the viewing environment and the given image in an ideal environment, based on the generated viewing environment information;

correcting the calculated color difference when the calculated color difference lies outside a permissible correction range so that the corrected color difference lies within the permissible correction range, correcting the calculated color difference including correcting brightness information included in the viewing environment information to conform with brightness of the ideal environment, based on the viewing environment information, when brightness of the image in the viewing environment differs from the brightness of the image in the ideal environment; and correcting the image display information, based on the corrected color difference.

8. The image processing method as defined by claim 7, correcting the calculated color difference including multiplying the calculated color difference by a given coefficient and outputting the corrected color difference.

9. The image processing method as defined by claim 8, correcting the calculated color difference further comprising calculating the color difference based on the color information included in the viewing environment information, in which the brightness information has been corrected, and color information of the image in the ideal environment.

10. A computer-readable information storage medium which stores program for correcting image display information for displaying an image, based on viewing environment information indicating a viewing environment in a display area of the image, the information storage medium comprising:

a program to implement on a computer viewing environment generation section which generates the viewing environment information;

color difference calculation section which calculates color difference between a given image in the viewing environment and the given image in an ideal environment, based on the generated viewing environment information;

color difference correction section which corrects the calculated color difference when the calculated color difference lies outside a permissible correction range so that the calculated color difference lies within the permissible correction range, the color difference correction section further comprising a brightness correction section which corrects the brightness information included in the viewing environment information to conform with the brightness of the ideal environment, based on the viewing environment information, when the brightness information of the image in the viewing environment differs from the brightness of the image in the ideal environment; and image display correction section which corrects the image display information, based on the corrected color difference.

11. The information storage medium as defined by claim 10, the color difference correction section outputting the corrected color difference by multiplying the calculated color difference input to the color difference correction section by a given coefficient.

12. The information storage medium as defined by claim 11, the coefficient being a functional value that varies according to brightness of the image in an ideal environment or brightness information included in the viewing environment information.

13. The information storage medium as defined by claim 12, the color difference correction section further comprising a color difference calculation section which calculates the color difference based on the color information included in the viewing environment information, in which the brightness information has been corrected, and color information of the image in the ideal environment.

* * * * *